(12) United States Patent
Mizuno et al.

(10) Patent No.: US 7,871,534 B2
(45) Date of Patent: Jan. 18, 2011

(54) METHOD FOR DUST-PREVENTIVE TREATMENT OF MATERIAL HAVING DUSTING PROPERTY

(75) Inventors: Yoshitomo Mizuno, Chita-gun (JP); Teruo Urano, Sano (JP); Kazuo Konabe, Shizuoka (JP); Mitsuyoshi Kawazoe, Shizuoka (JP)

(73) Assignees: Nippo Corporation, Chuo-Ku, Tokyo (JP); Murakashi Lime Industry Co., Ltd., Sano-Shi, Tochigi (JP); Du Pont-Mitsui Fluorochemicals Co., Ltd., Chiyoda-Ku, Tokyo (JP)

( * ) Notice: Subject to any disclaimer, the term of this patent is extended or adjusted under 35 U.S.C. 154(b) by 183 days.

(21) Appl. No.: 11/922,418

(22) PCT Filed: Jun. 29, 2005

(86) PCT No.: PCT/JP2005/011902

§ 371 (c)(1),
(2), (4) Date: Dec. 18, 2007

(87) PCT Pub. No.: WO2007/000812

PCT Pub. Date: Jan. 4, 2007

(65) Prior Publication Data

US 2009/0236560 A1    Sep. 24, 2009

(51) Int. Cl.
*C09K 3/22* (2006.01)

(52) U.S. Cl. ..................... 252/88.1; 252/88.2

(58) Field of Classification Search ............... None
See application file for complete search history.

(56) References Cited

U.S. PATENT DOCUMENTS

| 2,559,752 | A  | 7/1951 | Berry |
| 5,788,879 | A  | 8/1998 | Ogura et al. |
| 2004/0186219 | A1 | 9/2004 | Dadalas et al. |
| 2005/0113507 | A1 | 5/2005 | Bladel et al. |

FOREIGN PATENT DOCUMENTS

| JP | 52-32877 |       | 8/1977 |
| JP | 8-020767 | A | 1/1996 |
| JP | 2002-532583 | A | 10/2002 |
| JP | 2005-501956 | A | 1/2005 |

*Primary Examiner*—Necholus Ogden, Jr.
(74) *Attorney, Agent, or Firm*—Buchanan Ingersoll & Rooney PC

(57) ABSTRACT

A method for dusting-preventive treatment of a dusting material using a dust-preventive treatment agent including a PTFE aqueous dispersion having lower potential for environmental concerns, which method is as effective as a known method and further has a lower possibility of environmental concerns, and the dust-preventive treated material obtained by treating the dusting material by the method. The method involves mixing a dust preventing treatment composition composed of an aqueous dispersion of polytetrafluoroethylene containing 50 ppm or less of a fluorine-containing emulsifier with the dusting material and then forming fibrils of polytetrafluoroethylene by applying a compression/shear force to the mixture above at a temperature of about 20° C. to 200° C.

4 Claims, No Drawings

METHOD FOR DUST-PREVENTIVE TREATMENT OF MATERIAL HAVING DUSTING PROPERTY

TECHNICAL FIELD

The present invention relates to a method for dust-preventive-treatment of a dusting material, that is a material having dusting property, using a dust-preventive treatment composition comprising aqueous dispersion of a polytetrafluoroethylene (hereinafter referred to as PTFE) that is highly effective in preventing dust and there is less concern to environment. More specifically, the present invention relates to a method for dusting-preventive treatment using a dusting-preventive treatment composition comprising aqueous dispersion of a polytetrafluoroethylene containing a fluorine-containing emulsifier in a specific concentration range, and a dusting-preventive treatment material using the dust-preventive treatment composition comprising an aqueous dispersion of a polytetrafluoroethylene associated with less environmental concern.

BACKGROUND TECHNOLOGY

The technology to prevent the dust derived from dusting material is an important technology for daily life and industry from the standpoint of health, safety and environmental issues.

Japanese Patent Publication SHO 52-32877 discloses a method for preventing dust derived from dusting materials by mixing dusting materials with PTFE and subjecting the mixture to compression-shearing at a temperature from about 20 to 200° C., thereby fibrillating the PTFE to prevent dusting of the powdery material.

The PTFE disclosed therein includes fine powder or emulsion form of homopolymer of tetrafluoroethylene denoted by TEFLON (registered trade mark) 6 or TEFLON (registered trade mark) 30, and also fine powder form of modified polymer of tetrafluoroethylene denoted by TEFLON (registered trade mark) 6C.

Japanese Laid-open Patent Application No. 8-20767 proposes a dust-preventive method having good stability using an aqueous emulsion containing a hydrocarbon-base anionic surfactant of not less than 1.0 wt % of PTFE as an emulsion stabilizer, and it discloses that the method is effective for cement dust prevention.

The above-mentioned PTFE particles are obtainable by such emulsion polymerization methods as disclosed in U.S. Pat. No. 2,559,752, in which tetrafluoroethylene is charged under pressure into an aqueous medium containing a water-soluble polymerization initiator and an anionic surfactant having hydrophobic fluoroalkyl radicals as the emulsion stabilizer so as to be polymerized to form the PTFE aqueous emulsion.

Further an emulsion stabilizer is added to the emulsion to improve the stability.

However, since these dust-preventive treatment agents are used in large quantities in fertilizers, soil stabilizers, soil solidification agents, reclamation materials such as an incinerated ash of coal (fly ash) and the like, and the scope application of dust-preventive treatment agent is expanding, concerns for the environmental impact has been increasing.

Though a surfactant (a fluorine-containing emulsifier) contained in the PTFE aqueous dispersion as an emulsifier is used in polymerization, it is difficult to decompose and causes concerns for the environmental impact. In addition, since such agent is not biodegradable and is classified as environmental pollutants, and it could potentially pollute ground water, lakes, marshes, rivers and the like.

Therefore, the inventors focused intensely on the improvement of a method that effectively prevents dust and can prevent dust without concern for the environmental impact. As the result, the present invention was developed.

Patent Reference 1: Japanese Patent SHO 52-32877.

Patent Reference 2: the Japanese Laid-open Patent Application HEI 8-20767

Patent Reference 3: U.S. Pat. No. 2,559,752.

DISCLOSURE OF THE INVENTION

Problems for the Invention to be Solved

The inventors proceeded to develop a method for dust-preventive treatment with a low potential for environmental concerns after noticing that although a surfactant (fluorine-containing emulsifiers) present in aqueous PTFE dispersion as emulsifiers was essential in the polymerization to obtain the aqueous PTFE dispersion, it was difficult to decompose and was associated with environmental concerns.

That is, the objective of the present invention is to provide a method for dust preventive treatment using a dust-preventive treatment composition comprising a PTFE aqueous dispersion having a low potential for environmental concerns that shows a dust prevention effect as high as that of known method and further shows a lower potential for environmental concerns, and to provide the dust-preventive treated material of the dusting material, that is a dusting material treated by the dust-preventive treatment method.

Methods to Solve the Problems

The present invention provides a dust-preventive treatment method for a dusting material wherein the dust derived from dusting material is prevented by mixing a dust preventing treatment composition comprising an aqueous dispersion of polytetrafluoroethylene containing 50 ppm or less of a fluorine-containing emulsifier with the dusting material and subjecting the mixture to compression-shearing at a temperature from about 20 to 200° C., thereby fibrillating the PTFE to prevent the dust derived from dusting material.

The dust-preventive treatment method for a dusting material wherein the use of a dust-preventive treatment composition comprising an aqueous dispersion of PTFE having an average particle size of from 0.1 µm to 0.5 µm and containing 50 ppm or less of a fluorine-containing emulsifier is a preferred embodiment of the present invention.

The present invention also provides a dust-preventive treated material of the dusting material obtained by the aforementioned dust-preventive treatment method.

EFFECT OF THE INVENTION

By the present invention, the dust-preventive treatment method for a dusting material wherein a dust-preventive treatment composition comprising a PTFE aqueous dispersion with a low potential for environmental concerns is used and a dust prevention effect is as high as that of known method and further has lower potential for environmental concerns is provided.

By the present invention, the dust-preventive treated material of a dusting material treated by the excellent method for dust-preventive treatment of a dusting material, that is prevented from dust-forming and shows a low potential for environmental concerns, is provided.

BEST EMBODIMENT FOR CARRYING OUT THE INVENTION

The present invention provides a dust-preventive treatment method for a dusting material wherein the dust derived from dusting material is prevented by mixing the dust preventing treatment composition comprising the aqueous dispersion of polytetrafluoroethylene containing 50 ppm or less of a fluorine-containing emulsifier with the dusting material and subjecting the mixture to compression-shearing at a temperature from about 20 to 200° C., thereby fibrillating the PTFE to prevent the dust derived from dusting material, and also provides the dust preventing treated material of the dusting material.

As the PTFE usable for the present invention, a homopolymer of tetrafluoroethylene (TFE) that is usually called as homopolymer, and a copolymer (modified PTFE) of tetrafluoroethylene containing a comonomer of not more than 1%, that is usually called as modified polymer. A homopolymer of TFE is preferred as the PTFE.

A dust-preventive treatment agent comprising an aqueous dispersion of the modified PTFE exhibits a dust preventing effect inferior to that of the PTFE, and may frequently requires over 50% excessive amounts of the agent to show the same effect.

In the fluorine-containing polymer in an aqueous dispersion of the fluorine-containing polymer of the present invention, colloidal particles in which an average particle size is about 0.1 μm to 0.5 μm or preferably about 0.1 μm to 0.3 μm is desirable. Colloidal particles having an average particle size of smaller than 0.1 μm tend to result in inferior dust preventing effect, and those of larger than 0.5 μm tend to bring about unstable emulsions.

In addition, it is desirable that a specific gravity is 2.27 or lower, preferably 2.22 or lower, more preferably 2.20 or lower. Polytetraflouroethylene having a specific gravity of larger than 2.27 results an inferior dust preventing effect.

The concentration of fluorine-containing polymer in the aqueous dispersion of the fluorine-containing polymer of the present invention is not particularly restricted, but a concentration as low as possible is preferred in order to raise the dispersion effect of the fluorine-containing polymer in a dusting material. On the other hand, since the concentration as high as possible enables to save a transporting cost when the aqueous dispersion of the fluorine-containing polymer is transported, the concentration of normally 10% by weight or more, preferably 20% by weight to 70% by weight is desirable. Higher concentrations are not preferable since the stability of aqueous dispersion of the fluorine-containing polymer may be decreased. Therefore, the concentration of fluorine-containing polymer in the dust-preventive treatment composition, when it is sold as a product, is preferably 20% by weight to 70% by weight. When the treatment composition is mixed with the dusting material, it can be diluted with water to make the concentration of fluorine-containing polymer of 5% by weight or lower.

The lower content ratio is desirable for the fluorine-containing emulsifier in the aqueous dispersion of the fluorine-containing polymer of the present invention since it is hardly decomposed and its accumulation in the environment is concerned. A content ratio of 50 ppm or less is preferable since manufacturing at a stable fluorine-containing emulsifier content ratio using a practical removal method is possible.

The method to obtain the aqueous dispersion of fluorine-containing polymer containing 50 ppm or less of the fluorine-containing emulsifier in the present invention is not particularly restricted.

For example, such an aqueous dispersion can be obtained by removing the fluorine-containing emulsifier by the known method from an aqueous dispersion containing the fluorine-containing emulsifier (perfluorooctanoic acid in the form of an ammonium salt and/or an alkali salt) in about 0.02% to 1% by weight based on the weight of the fluorine-containing polymer produced by emulsion polymerization method as disclosed in U.S. Pat. No. 2,559,752, wherein tetrafluoroethylene is charged under pressure into an aqueous medium containing a water soluble polymerization initiator and an anionic surfactant having hydrophobic fluoroalkyl groups as emulsifier. As the known method for removing the fluorine-containing emulsifier from an aqueous dispersion, there can be cited methods described in Japanese Publication of PCT Application 2005-501956 (WO 2003/020836) and Japanese Publication of PCT Application 2002-532583 (WO 00/35971) wherein fluorine-containing emulsifier is separated and removed by contacting with a effective quantity of an anion exchange material, and in U.S. Pat. No. 4,369,226 wherein the fluorine-containing emulsifier is removed by ultra filtration of the aqueous dispersion of fluorine-containing polymer. The method to remove fluorine-containing emulsifier is not restricted to these methods.

Though the surfactant (the fluorine-containing emulsifier) contained in the PTFE aqueous dispersion as the emulsifier is essential because of its reaction inactivity in the polymerization, its removal as much as possible from a dust-preventive treatment agent is desired, since it is hardly decomposed and its environmental impact is concerned. In addition, it is desirable to recovery and re-utilize the fluorine-containing emulsifier because it is expensive.

The emulsifier disclosed in U.S. Pat. No. 2,559,752 may be selected and used as the emulsifier in the emulsion polymerization method used to obtain the aforementioned aqueous dispersion of fluorine-containing polymer of the present invention. For the objective of the present invention, the emulsifiers called as non-telogenic emulsifier is particularly preferable. For example, fluorine-containing alkanoic acids or their salts represented by $F(CF_2)_n(CH_2)_mCOOH$ (m is 0 or 1 and n is 6-20) containing about 6 to 20 carbon atoms, preferably about 6 to 12 carbon atoms, and fluorine-containing alkylsulfonic acids or their salts can be cited. As the salt, alkali metal salts, ammonium salts, amine salts etc. can be cited. Specifically, perfluoroheptanoic acid, perfluorooctanoic acid and their salts, 2-perfluorohexylethane sulfonic acids and their salts can be cited, but the acids and salts are not restricted to these examples.

Furthermore, the aqueous dispersion of fluorine-containing polymer of the present invention may also contain an emulsion stabilizer because it enhances the stability of the aqueous dispersion of fluorine-containing polymer. As the emulsion stabilizer, a hydrocarbon-base anionic surfactant is preferable. Since this surfactant forms a salt insoluble or hardly soluble in water with calcium, aluminum and iron that are essentially soil components, it can avoid the pollution of rivers, streams, lakes, swamps and underground water caused by surfactants.

As such a hydrocarbon-base anionic surfactant, higher fatty acid salts, higher alcohol sulfuric acid ester salts, liquid fatty oil sulfuric acid ester salts, aliphatic alcohol phosphoric acid ester salts, dibasic fatty acid ester sulfonic acid salts, alkyl allyl sulfonic acid salts, etc. are cited. In addition, Na, K, Li and $NH^4$ salts of polyoxyethylene alkyl phenyl ether ethylene sulfonic acids (n in polyoxyethylene is 1 to 6, the number of carbon atoms in the alkyl is 8 to 11), alkylbenzene sulfonic acids (the number of carbon atoms in the alkyl is 10 to 12) and dialkylsulfosuccinic acid esters (the number of carbon atoms in the alkyl is 8 to 10) can be cited as preferable examples since they impart excellent mechanical stability to a PTFE aqueous emulsion.

The amount of an emulsion stabilizer is 1.0% by weight or more based on the weight of PTFE, preferably in the range of 1.5% to 5% by weight.

An amount less than 1.0 wt % provides unsatisfactorily stabilized aqueous PTFE emulsions, and that larger than 10 wt % is uneconomical.

The dust-preventive treatment method of the present invention is the method that specifically uses a dust-preventive treatment agent comprising the PTFE aqueous dispersion containing 50 ppm or less of fluorine-containing emulsifier in the method wherein the dust derived from dusting material is prevented by mixing PTFE with the dusting material and subjecting the mixture to compression-shearing at a temperature from about 20 to 200° C., thereby fibrillating the PTFE to prevent the dust derived from dusting material, such method as described in Japanese Patents No. 2827152 and Patent No. 2538783.

In addition, the dust-preventive treatment composition used in the present invention may be used as the fibril forming PTFE described in the Japanese Laid-open Patent Application No. 2000-185956, 2000-185959 and 2002-60738.

The specified polytetrafluoroethylene is fibrillated to form super fine fibers like in the state of cobweb when a compression-shear force is exerted under the appropriate condition described above. It is considered that the dusting-preventive treatment material for the dusting material of the present invention achieves the dust-preventing effect as the result that the dust derived from dusting material is captured and agglomerated in the cobweb-like fine fibers.

The dusting material treated for dust prevention in the present invention is an inorganic and/or organic dusting material, and there are no particular restrictions on its material and shape. The present invention can also be applied effectively to a dust forming powdery material as the dusting material. Examples of particularly suitable dusting material include cements such as portland cement, alumina cement, etc.; mined powders such as calcium hydroxide, calcium oxide powder, calcium carbonate, dolomite, magnesite, talc, silicic rocks powders, fluorite, etc.; clay mineral powders such as kaolin, bentonite, etc.; slag powders formed as by-products in the manufacturing processes for metals such as iron steel, nonferrous metals, etc.; an incinerated ash powders such as coal, trash, etc; gypsum powders; powdery metals; carbon black; activated carbon powder; ceramic powders such as metal oxides, etc; pigments; and others. That is, all dusting material that cause solid particulate substances scattered and floated in the air, that is the dust derived from dusting material, may be cited.

The dust-preventive treatment method of the present invention can suitably be used for dust-preventive treating a dusting material to obtain the dust-prevented material in the field of building material field, soil stabilizer field, solidifying material field, fertilizer field, landfill disposal field for burned ash and toxic substance, explosion-prevention field, cosmetic product field, filler field for various plastics, and the like.

EXAMPLES

The present invention is more specifically explained by citing examples and comparative examples below, but the present invention is not limited to those examples by any means.

Measurements of the properties in the present invention were conducted according to methods described below.

(1) Average Particle Diameter of Fluorine-Containing Polymer Particles.

The average particle diameter of fluorine-containing polymer particles was measured using Microtrack UPA150, Model No. 9340 (manufactured by Nikki So).

(2) Particle Diameter of Dust Forming Powder.

Particle diameter of dust forming powder was measured with the laser diffraction/dispersion type particle size distribution meter manufactured by Horiba Seisakusho Co., Ltd. using ethanol as the dispersion medium.

(3) Standard Specific Gravity of Fluorine-Containing Polymers.

The specific gravity was measured according to ASTM D-4894.

The concentration of the PTFE aqueous dispersion obtained by emulsion polymerization is adjusted 15% by weight using pure water. And then, about 750 ml of the aqueous dispersion was put in a polyethylene container (1,000 ml capacity) and the polymer was agglomerated by shaking the container vigorously by hand. The polymer powder separated from water was dried for sixteen hours at 150 degree C. 12.0 g of the dried resin powder was put in a cylindrical mold with a diameter of 2.85 cm and leveled. The pressure was gradually increased to reach the final pressure of 350 kg/cm$^2$ after 30 seconds. The final pressure of 350 kg/cm$^2$ was kept for two minutes. The preliminary molded article thus obtained was sintered in an air furnace for 30 minutes at 380° C., cooled to 294° C. at a rate of 1° C. per minute, kept at 294° C. for 1 minute then took it out of the air furnace and cooled at room temperature (23±1° C.) to obtain a standard sample. The weight ratio of the standard sample to the weight of water of the same volume at room temperature (23±1° C.) is made the standard specific gravity. This standard specific gravity is an aim of average molecular weight, and generally, the lower the standard specific gravity is, the higher the molecular weight is.

(4) Fluorine-Containing Emulsifier Concentration in Fluororesin Aqueous Dispersion.

A fluororesin aqueous dispersion in the polyethylene container was put in a freezer of −20° C. and frozen. The fluorine-containing polymer was agglomerated and separated from water. The contents of the polyethylene container were completely transferred to a Soxhlet extractor, and the extraction is conducted for 7 hours with about 80 ml of methanol. The sample solution that was measured up to the prescribed amount is measured by liquid chromatography, then the fluorine-containing emulsifier concentration in the fluororesin aqueous dispersion is calculated.

(5) Falling Dust Amount 200 g of a sample is fallen naturally from the top mouth of a cylindrical container with an internal diameter of 39 cm and a height of 59 cm. The floating dust amount [relative concentration (CPM: count per minute)] in the container at 45 cm high from the bottom was measured by a scattering light digital dust meter. The measurement of floating dust amount is carried out five times for 1 minute consecutively after the sample was put in and the measurement value (a dark count) before the sample was put in is subtracted. The geometric average value thus obtained is referred as the "falling dust amount". The geometric average value, x, was calculated according to the following formula.

$$\text{Log } x = 1/5 \Sigma \log(xi-d)$$

Here, xi is floating dust amount and d is a dark count.

(Raw Materials)

The raw materials used in the examples of the present invention and comparative examples are shown below.

(1) PTFE Aqueous Dispersion (I)

Properties of (I): Average particle diameter of 0.2 μm, resin solid concentration of 30% by weight, content of fluorine-containing emulsifier of 21 ppm, specific gravity of 2.19 and anionic surfactant content of 3.5% by weight based on the PTFE weight.

(2) PTFE Aqueous Dispersion (II).

Manufactured by Mitsui DuPont Fluorochemicals Co., Ltd., 312-J.

Properties of (II): resin solid concentration of 30% by weight, content of fluorine-containing emulsifier of 1040 ppm, specific gravity of 2.19 and anionic surfactant content of 3.0% by weight based on PTFE weight.

(3) Quick Lime Powder (CaO 93.5 wt. % and MgO 4.2 wt. %)

A quick lime powder that passed completely through a standard mesh sieve of 300 μm, left 0.04% on the standard mesh sieve of 150 μm, left 0.17% on the standard mesh sieve of 90 μm and passed 99.83% through a standard mesh sieve of 90 μm.

(4) Normal Portland Cement (NPC) (Manufactured by Taiheiyo Cement).

(5) Type II Anhydrou Gypsum (Average Particle Diameter 9.0 μm and Maximum Particle Diameter 101 μm).

(6) Blast-Furnace Slag Powder (Average Particle Diameter 8.9 μm and Maximum Particle Diameter 100 μm).

Example 1

1000 g of quick lime powder was put into a 5 L capacity small soil mixer, and dispersion obtained by dispersing 1.67 g of PTFE aqueous dispersion (I) (equivalent to 0.05% by weight of PTFE resin solid component based on the quick lime) in 98.8 g of clean water was gradually put in under agitation with 140 r.p.m. of rotation speed. Steam was generated about 1 minute after input because of hydration reaction heat of quick lime, and for 2 minutes, all of the water was exhausted for hydration reaction of quick lime to form hydrated lime and then no steam generation was observed. The agitation of the mixer was stopped 5 minutes after the agitation was started. The temperature at this point measured with a mercury thermometer was 95° C. The dust-preventive treated quick lime was a mixture of the quick lime and the hydrated lime, which contains about 30% of hydrated lime newly formed because of the hydration. The falling dust amount of the dust-preventive treated quick lime was measured. The results are shown in Table 1.

Example 2

The dust-preventive treated quick lime was obtained in the same manner as in Example 1 except using dispersion obtained by dispersing 1.00 g of the PTFE aqueous dispersion (I) (equivalent to 0.03% by weight of PTFE resin solid component based on the quick lime) in 99.3 g of clean water. The falling dust amount of the dust-preventive treated quick lime was measured. The results are shown in Table 1.

Example 3

A method that the normal portland cement (a dust forming powder) is heated using the hydration reaction heat of quick lime and dust-preventive treatment is conducted is provided.

100 g of quick lime powder was put into small soil mixer of 5 L capacity, and the dispersion obtained by dispersing 1.67 g of the PTFE aqueous dispersion (I) (equivalent to 0.50% by weight of PTFE resin solid component based on the quick lime) in 35.0 g of clean water was gradually input under agitation with 140 r.p.m. of rotation speed. Steam was generated about 1 minute after input because of hydration reaction heat of quick lime, and for 2 minutes, all of the water was exhausted for hydration reaction of quick lime to form hydrated lime and then no steam generation was observed. The agitation of the mixer was stopped 5 minutes after the agitation was started. The temperature at this point measured with a mercury thermometer was 95° C. The dust-preventive treated quick lime was a mixture in a shape of ball of quick lime and hydrated lime, which contains newly formed hydrated lime because of the hydration.

This was used as a master of master batch, and 900 g of normal portland cement was gradually put in the small soil mixer (rotation speed 140 r.p.m.) under agitating. The agitation of the mixer was stopped about 5 minutes after input of the normal portland cement. The temperature at this point measured with the mercury thermometer was 57° C. The falling dust amount of the dust-preventive treated normal portland cement was measured. The results are shown in Table 1.

Examples 4-6

200 g of the dust forming powder shown in Table 1 was preheated to 90° C. with an electric heat dryer. 20 g of heated dust forming powder and the PTFE aqueous dispersion (I) with the solid ratio (% by weight) shown in Table 1 were mixed and agitated for about 5 minutes in an alumina mortar of 1 L capacity pre-heated to 90° C. with an electric heat dryer to obtain the mixture. The mixture thus obtained was used as a master, and 180 g of remaining the heated dust forming powder was added to the mixture above. The mixture was mixed and agitated for about 5 minutes, and the dust-preventive treated dust forming powder was obtained. The falling dust amount of the dust forming powder obtained was measured. The results are shown in Table 1.

Comparative Example 1

The falling dust amount of the quick lime powder was measured. The results are shown in Table 1.

Comparative Example 2

The falling dust amount of the normal portland cement was measured. The results are shown in Table 1.

Comparative Example 3

The falling dust amount of a type II anhydrous gypsum was measured. The results are shown in Table 1.

Comparative Example 4

The falling dust amount of a blast-furnace slag powder was measured.
The results are shown in Table 1.

Reference Example 1

The dust-preventive treated quick lime was obtained in the same manner as in Example 1 except that the dispersion by dispersing 1.67 g of the PTFE aqueous dispersion (II) (equivalent to 0.05% by weight of PTFE resin solid component based on the quick lime) in 98.8 g of clean water was used. The falling dust amount of the dust-preventive treated quick lime thus obtained was measured. The results are shown in Table 1.

Reference Example 2

The dust-preventive treated quick lime was obtained in the same manner as in Example 1 except that the dispersion by dispersing 1.00 g of the PTFE aqueous dispersion (II) (equivalent to 0.03% by weight of PTFE resin solid component based on the quick lime) in 99.3 g of clean water was used. The falling dust amount of the dust-preventive treated quick lime thus obtained was measured. The results are shown in Table 1.

Reference Examples 3-5

The dust-preventive treated dust forming powder was obtained in the same manner as in Example 4 to 6 except using the PTFE aqueous dispersion (II). The falling dust amount of the dust forming powder thus obtained was measured. The results are shown in Table 1.

TABLE 1

|  | Dust forming powder | PTFE aqueous dispersion | PTFE amount (wt % based on dust forming powder) | Falling dust amount (CPM) |
| --- | --- | --- | --- | --- |
| Example 1 | Quick lime powder | (I) | 0.05 | 9.2 |
| Example 2 | Quick lime powder | (I) | 0.03 | 12.8 |
| Example 3 | Normal Portland cement (containing quick lime powder | (I) | 0.05 | 13.0 |
| Example 4 | Normal Portland cement | (I) | 0.05 | 19.1 |
| Example 5 | Type II anhydrous gypsum | (I) | 0.10 | 62.8 |
| Example 6 | Blast-furnace slag powder | (I) | 0.06 | 14.6 |
| Comp. Ex. 1 | Quick lime powder | — | — | 164.0 |
| Comp. Ex. 2 | Normal Portland cement | — | — | 426.7 |
| Comp. Ex. 3 | Type II anhydrous gypsum | — | — | 232.1 |
| Comp. Ex. 4 | Blast-furnace slag powder | — | — | 195.1 |
| Ref. Ex. 1 | Quick lime powder | (II) | 0.05 | 13.0 |
| Ref. Ex. 2 | Quick lime powder | (II) | 0.03 | 14.5 |
| Ref. Ex. 3 | Normal Portland cement | (II) | 0.05 | 35.9 |
| Ref. Ex. 4 | Type II anhydrous gypsum | (II) | 0.10 | 60.6 |
| Ref. Ex. 5 | Blast-furnace slag powder | (II) | 0.06 | 18.5 |

APPLICABILITY TO INDUSTRIAL USE

By the present invention, the dust-preventive treatment method for a dusting material wherein a dust-preventive treatment composition comprising a PTFE aqueous dispersion with a low potential for environmental concerns is used and a dust prevention effect is as high as that of known method and further has lower potential for environmental concerns, and the dust-preventive treated material of a dusting material is provided.

The invention claimed is:

1. A method for dust-preventive treatment for a dusting material wherein the dust derived from dusting material is prevented by mixing a dust-preventive treatment composition comprising an aqueous dispersion of polytetrafluoroethylene containing 50 ppm or less of a fluorine-containing emulsifier with the dusting material and then by forming fibrils of polytetrafluoroethylene under conducting a compression/shear force to the mixture above at a temperature of about 20° C. to 200° C., wherein the aqueous dispersion of polytetrafluoroethylene is an aqueous dispersion of polytetrafluoroethylene having an average particle diameter of 0.1 μm to 0.5 μm and having a specific gravity of 2.27 or lower.

2. The method for dust-preventive treatment for a dusting material according to claim 1 wherein the dusting material is a powdery dusting material.

3. A dust-preventive treated material obtained by treating a dusting material using the method for dust-preventive treatment described in claim 1.

4. A dust-preventive treated material obtained by treating a dusting material using the method for dust-preventive treatment described in claim 2.

* * * * *